(12) United States Patent
Aweya (10) Patent No.: US 10,979,164 B2
(45) Date of Patent: Apr. 13, 2021

(54) PEER-TO-PEER TRANSPARENT CLOCKS AND METHODS OF ESTIMATING SKEW IN PEER-TO-PEER TRANSPARENT CLOCKS

(71) Applicants: Khalifa University of Science and Technology, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science and Technology, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 167 days.

(21) Appl. No.: 16/036,186

(22) Filed: Jul. 16, 2018

(65) Prior Publication Data
US 2020/0021379 A1 Jan. 16, 2020

(51) Int. Cl.
*H04J 3/06* (2006.01)
(52) U.S. Cl.
CPC .......... *H04J 3/0644* (2013.01); *H04J 3/0682* (2013.01)
(58) Field of Classification Search
USPC ........................................................ 709/248
See application file for complete search history.

(56) References Cited

U.S. PATENT DOCUMENTS

| | | | | |
|---|---|---|---|---|
| 2007/0061607 A1* | 3/2007 | Carlson | ..................... | G06F 1/10 713/503 |
| 2013/0055007 A1* | 2/2013 | Dai | ........................ | G06F 30/39 713/503 |
| 2016/0170439 A1* | 6/2016 | Aweya | ..................... | G06F 1/10 713/401 |

FOREIGN PATENT DOCUMENTS

CN 102546142 A 7/2012

OTHER PUBLICATIONS

International Search Report dated Jul. 16, 2018 on PCT/EP2018/069289.
Huawei Technologies Co., Ltd. Equivalence of the IEEE 1588 Boundary Clock and Peer-to-Peer Transparent Clock for Synchronization Transport, International Telecommunication Union, Telecommunication Standardization Sector Study Period 2009-1012, COM 15—C1001-E, pp. 1-8, May 2010.
Xiong Xu, et al., A New Time Synchronization Method for Reducing Quantization Error Accumulation Over Real-Time Networks: Theory and Experiments, IEEE Transactions on Industrial Informatics, vol. 9, No. 3, Aug. 2013, pp. 1659-1669.

(Continued)

*Primary Examiner* — Hermon Asres
(74) *Attorney, Agent, or Firm* — Calfee, Halter & Griswold LLP (57) ABSTRACT

This invention relates to peer-to-peer transparent clocks and methods of estimating skew in peer-to-peer transparent clocks. Embodiments of the invention relate to techniques for estimating clock skew between a free-running clock in a transparent clock and a master clock, in particular by using the timing information embedded in timing messages pass- (Continued)

ing through the transparent clock. Further embodiments of the invention set out uses of these estimates to modify the residence times computed by the transparent clock and a synchronization network including such transparent clocks.

15 Claims, 6 Drawing Sheets

(56) References Cited

OTHER PUBLICATIONS

Jiho Han, et al. Practical Considerations in the Design and Implementation of Time Synchronization Systems Using IEEE 1588, IEEE Communications Magazine, Nov. 2009, pp. 164-170.
Kalman, R.E. A New Approach to Linear Filtering and Prediction Problems, Transactions of the ASME-Journal of Basic Engineering, 82 (Series D): 35-45. Copyright © (1960) by ASME.

\* cited by examiner

PEER-TO-PEER TRANSPARENT CLOCKS AND METHODS OF ESTIMATING SKEW IN PEER-TO-PEER TRANSPARENT CLOCKS

FIELD OF THE INVENTION

The present invention relates peer-to-peer transparent clocks and methods of estimating skew in peer-to-peer transparent clocks. It is particularly, but not exclusively, concerned with techniques for estimating clock skew between a free-running clock in a transparent clock and a master clock.

BACKGROUND OF THE INVENTION

IEEE 1588 PTP is a two-way time/frequency transfer protocol wherein a GrandMaster (master) clock generates messages (packets) with precise timestamps that are sent downstream to slave devices. The slave devices also exchange messages with the GrandMaster via a delay measurement mechanism to obtain timestamps in order to derive an accurate estimate of the GrandMaster clock. Devices between the master and slave clocks may be ordinary switches and routers, or specialized equipment with on-path support, such as transparent clocks (TCs), that can be used to mitigate the effects of timing impairments introduced by the network between the master and slave.

TCs were introduced in IEEE 1588 Version 2 to allow a synchronization network to measure the actual delays synchronization packets experience and to communicate these delay measurements to slaves. The slaves can then adjust their clocks while compensating for the actual delay variations. For most accurate residence time measurements, the PTP clocks in each TC should be syntonized (synchronized in frequency) with the GrandMaster. Accurate residence time measurements determine to a large extent how accurate the clock synchronization at the slave will be. However, the clock skews (or frequency differences) between the clocks at the TCs on the path and the GrandMaster can render the residence time measurements inaccurate. To obtain more accurate measurements at the TCs, the clock skews have to be accurately estimated and removed from (or compensated for in) the measurements.

One way to do so is to physically tune the frequency of the TC clocks to be syntonized to the GrandMaster clock. The accurately syntonized TC clocks can then be used for residence time measurements. Alternatively, syntonization may be handled on the TC processor (in software) without physically adjusting the rate of the TC clocks, that is, the TCs use free-running clocks. The computed clock skew (between the free-running TC clock and GrandMaster) may be used by the TC to modify the measured residence times inserted into Sync/Follow_Up messages.

There are currently two main methods used to syntonize the TC clocks. One is using Synchronous Ethernet (SyncE) (defined in ITU-T Recommendations G.8261, G.8262, and G.8264) which is a timing transfer method that passes timing over the Physical Layer of Ethernet using SONET/SDH-like timing techniques. The main limitation of this method is that it cannot be applied over networks (even Ethernet) which have already been deployed without such timing transfer capabilities. An implementation will require an all SyncE network on the path linking the GrandMaster and the TC. In such an implementation, the timing signal carried by SyncE is used to frequency lock the TC oscillator is to the GrandMaster The other method is to generate syntonization signals from timestamps captured from Sync messages (only) sent from the GrandMaster to the slave device. The syntonization signal can be used to physically tune the TC oscillator or modify the measured residence times. The example methods described in the IEEE 1588 Version 2 Standard for generating the syntonization signals are very simplistic (using Sync messages only and simple linear estimation techniques) and generally do not provide accurate syntonization.

Overview of IEEE 1588v2 PTP

The GrandMaster (GM) is the root timing reference in a domain and transmits synchronization information to the clocks residing in its domain. In IEEE 1588v2 PTP messages are categorized into event and general messages. All IEEE 1588 PTP messages have a common header. Event messages are timed messages in that an accurate timestamp is generated at both transmission and receipt of each message. Event messages have to be accurately timestamped since the accuracy in transmission and receipt timestamps directly affects clock distribution accuracy.

A timestamp event is generated at the time of transmission and reception of any event message. General messages are not required to be timestamped. The set of event messages consists of Sync, Delay_Req, Pdelay_Req, and Pdelay_Resp. The set of general messages consists of Announce, Follow_Up, Delay_Resp, Pdelay_Resp_Follow_Up, Management, and Signaling.

IEEE 1588 PTP allows for two different types of timestamping methods, either one-step or two-step. One-step clocks update time information within event messages (Sync and Delay-Req) on-the-fly, while two-step clocks convey the precise timestamps of packets in general messages (Follow_Up and Delay-Resp).

The Sync, Delay_Req, Follow_Up, and Delay_Resp messages are used to generate and communicate the timing information needed to synchronize ordinary and boundary clocks (see description below) using the delay request-response mechanism. A Sync message is transmitted by a GM to its slaves and either contains the exact time of its transmission or is followed by a Follow_Up message containing this time. In a two-step ordinary or boundary clock, the Follow_Up message communicates the value of the departure timestamp for a particular Sync message. A Delay_ Req message is a request for the receiving node to return the time at which the Delay_Req message was received, using a Delay_Resp message.

Figure 1:
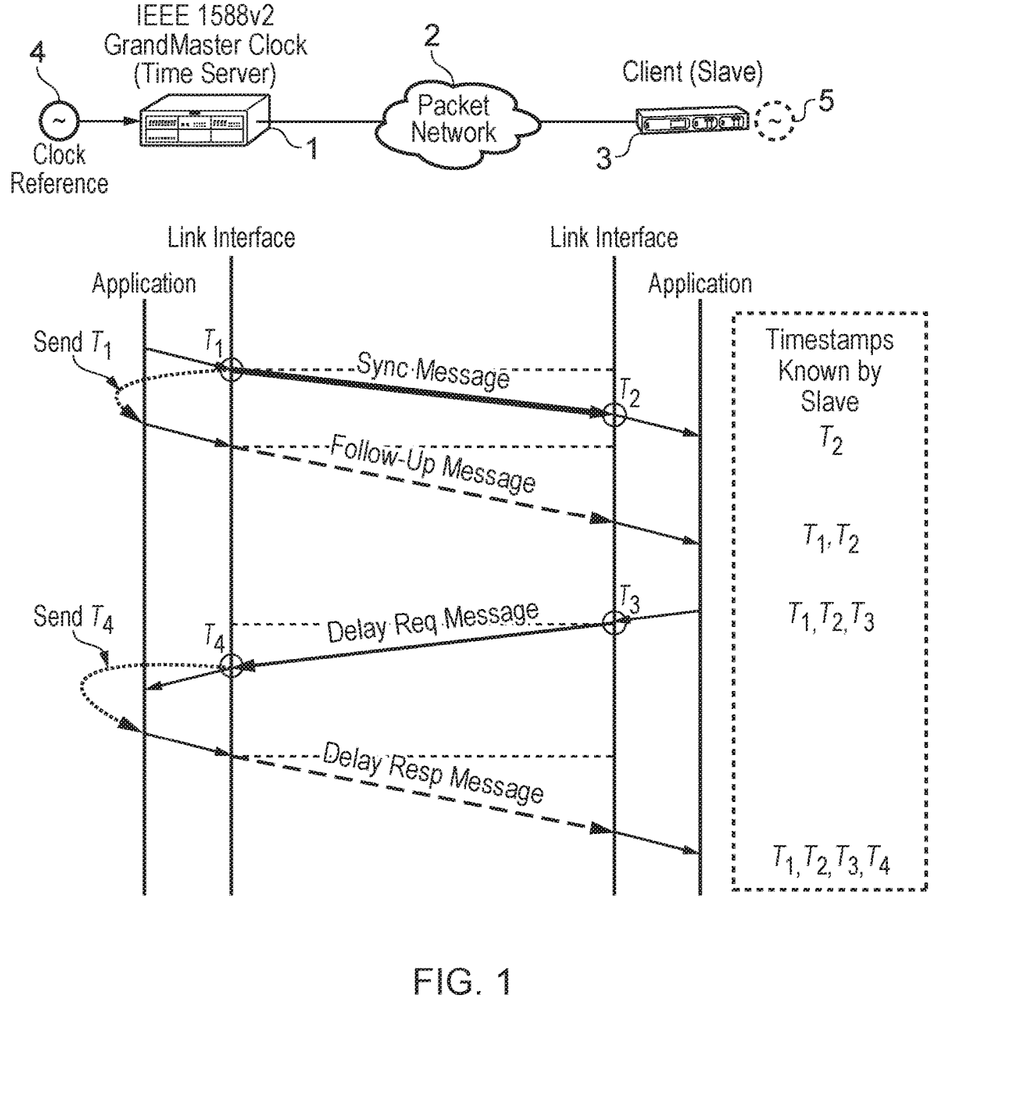
FIG. 1 shows the message flow according to the two-step clock of IEEE 1588 PTP and has already been described.

The basic pattern of synchronization message exchanges for the one-step and two-step clocks are illustrated in FIG. 1. The message exchange pattern for the two-step clock can be explained as follows. The GM 1 sends a Sync message to the slave 3 over a packet network 2 and notes the time $T_1$ at which it was sent according to the GM clock 4. The slave 3 receives the Sync message and notes the time of reception $T_2$ according to the slave clock 5. The GM 1 conveys to the slave the timestamp $T_1$ by one of two ways: 1) Embedding the timestamp $T_1$ in the Sync message (one-step clock). This requires some sort of hardware processing (i.e., hardware timestamping) for highest accuracy and precision. 2) Embedding the timestamp $T_1$ in a Follow_Up message (two-step clock). Next, the slave 3 sends a Delay_Req message to the GM 1 and notes the time $T_3$ at which it was sent according to the slave clock 5. The GM 1 receives the Delay_Req message and notes the time of reception $T_4$ according to the GM clock 4. The GM 1 conveys to the slave the timestamp $T_4$ by embedding it in a Delay_Resp message.

At the end of this PTP messages exchange, the slave 3 possesses all four timestamps $\{T_1, T_2, T_3, T_4\}$. These timestamps may be used to compute the offset of the slave clock 5 with respect to the GM clock 4 and the mean propagation time of messages between the two clocks. The computation of offset and propagation time often assumes that the GM-to-slave and slave-to-GM propagation times are equal i.e. a symmetrical communication path.

Transparent Clocks

A TC acts invisibly to the GM and slave from a synchronization perspective by providing a timestamp correction term to PTP event messages traversing the TC. There are two forms of transparent clocks. The end-to-end (E2E) TC provides a correction that reflects the residence time (or dwell-time) of the packet within the equipment itself. A peer-to-peer (P2P) TC includes in the correction its own internal delay as well as an estimate of the link delay between itself and its upstream device.

TCs are PTP devices that operate as normal switches, but they update the correction field (correctionField) of the PTP packets with a value equal to their residence time, that is, the time the packet was delayed in the switch (E2E TCs), or the residence time plus the peer link delay (P2P TCs). The purpose of the TC function providing on-path support is to remove the effect of PDV by informing downstream devices of precisely what these delays were on a packet-by-packet basis.

An End-to-End (E2E) TC is a multi-port device that is not a master or slave clock but a bridge between the two. E2E TCs only measure the time taken for a PTP event message (Sync and Delay_Req) to transit the bridge and provide this information to the receiving slave clocks in the correction field. The E2E TC does not include the propagation delay of the upstream link connected to the ingress port through which the message arrived. This information is not added to the correction field by the E2E TC.

Figure 2:
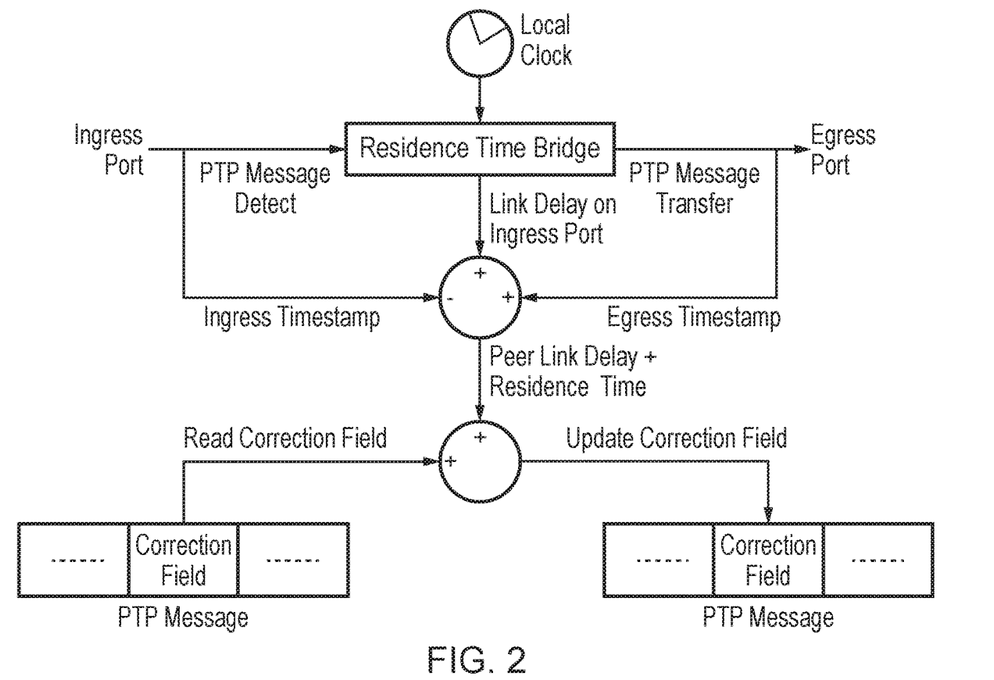
FIG. 2 shows the operation of the clock corrections in a peer-to-peer (P2P) transparent clock and has already been described.

A P2P TC is also a multi-port device that is not a master or slave clock but a bridge between the two. This clock determines the residence time of a Sync message through the switch. It also determines the delay of the inbound path (link) using the PTP peer delay mechanism. Both values are added up and placed in the correction field of the Sync message or associated Follow_Up message (FIG. 2).

Figure 3:
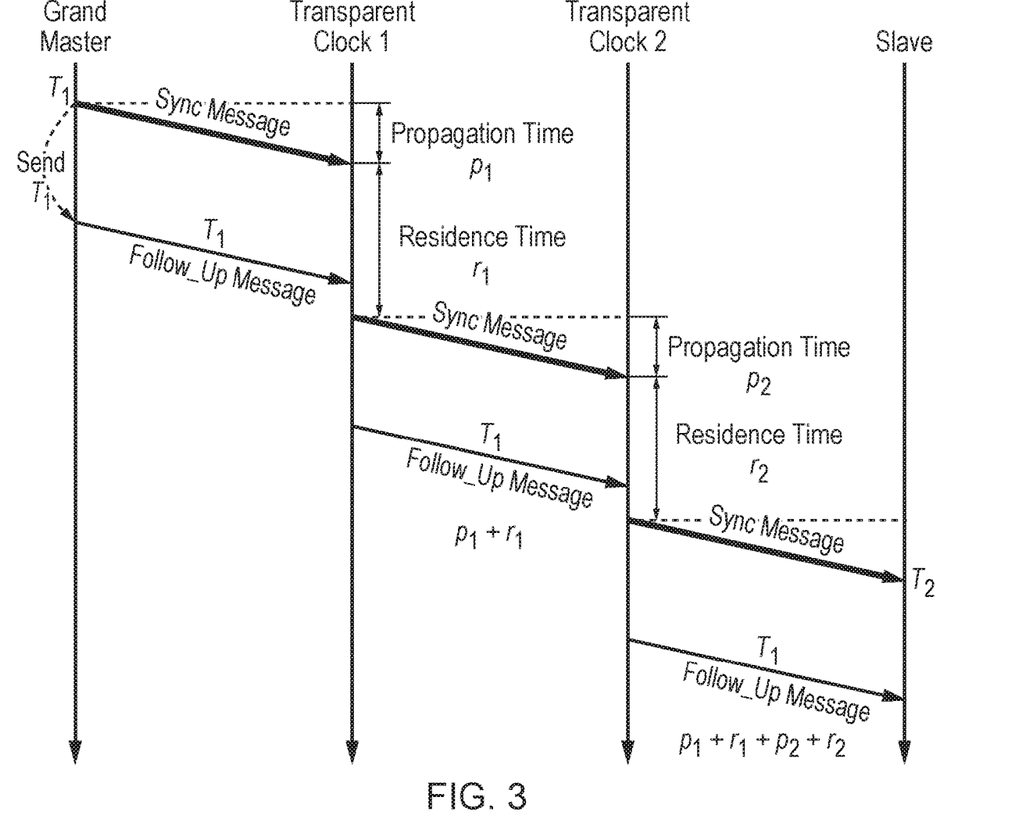
FIG. 3 shows the message flow through P2P transparent clocks and has already been described.

In the end-to-end approach (i.e., networks with E2E TCs), delay measurement messages (Sync, Follow_Up, Delay_Req, and Delay_Resp messages) are exchanged between the master and the slave using the PTP Delay Request-Response measurement mechanism. In the peer-to-peer approach (i.e., networks with P2P TCs) the master still sends Sync and Follow_Up messages to the slave clock just as in the end-to-end approach except no Delay_Req and Delay_Resp messages are exchanged. A P2P TC forwards and modifies Sync and Follow_Up messages only to compensate for residence time and peer uplink delay (FIG. 3). A one-step P2P TC updates for switch delay in Sync messages as they pass through the switch while a two-step TC updates a field in the non time-critical general message (Follow_Up).

The upstream link delay is the estimated packet propagation delay between the upstream neighbor P2P TC and the P2P TC under consideration. The correction field of the message received by the slave contains the sum of all residence times and link delays. In theory this is the total end-to-end delay (from master to slave) of the Sync packet.

Figure 4:
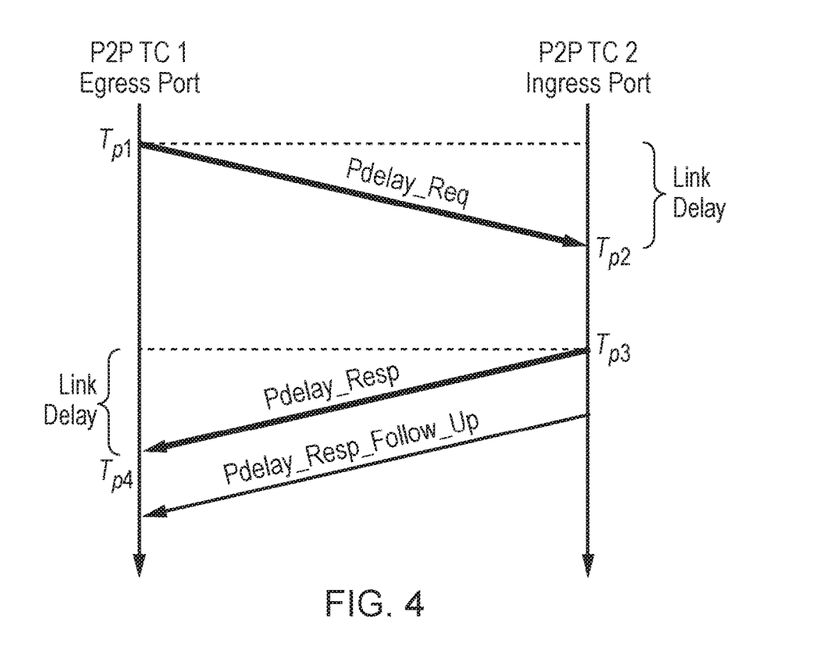
FIG. 4 shows how P2P transparent clocks measure peer link delays and has already been described.

P2P TCs use the following event messages for peer delay measurements: Pdelay_Req Pdelay_Resp, and Pdelay_Resp_Follow_Up. These messages are sent in the sequence shown in FIG. 4. In the peer-to-peer approach, each device on the network exchanges peer-delay measurement messages. This allows each device to keep track of the delays between itself and its immediately connected neighbors.

Each device periodically initiates an exchange of peer-delay messages on every connected port. The peer delay mechanism measures the port-to-port propagation time, i.e., the link delay, between two communicating ports supporting the peer delay mechanism. The link delay measurements are made independently by each port implementing the peer delay mechanism. This means that the link delay is known by ports on both ends of a link. This allows path length corrections to be made immediately upon reconfiguration of the network.

With this requirement and given two P2P TCs, TC1 and TC2 (FIG. 4), TC1 (upstream) initiates the peer delay mechanism to TC2 (downstream). Similarly, TC2 initiates an independent peer delay mechanism to TC1. TC2 initiates the same series of messages in the reverse direction so that both clocks know the peer-delay. However, TC2 is the TC (and not TC1) that updates the peer link delay in the Sync (or Follow_Up) message for the peer link under consideration. This is to avoid double link delay updating for a peer link under consideration. At the end of this PTP messages exchange, the downstream P2P TC possesses all four timestamps $\{T_{p1}, T_{p2}, T_{p3}, T_{p4}\}$. These timestamps are then used to compute the upstream link delay.

In a peer-to-peer network, all links are periodically measured, so the delay between the master and slave are readily known when the network path/topology changes. Note that peer-delay messages are exchanged even on ports blocked to prevent loops, such as by the Rapid Spanning Tree Protocol.

As the process in FIG. 3 continues hop by hop (where N is the number of hops or links), the Sync or Follow-Up Messages maintain a running total of the residence and propagation times; resulting in a grand total delay value from master to slave:

$$\text{total\_residence\_time\_plus\_propagation\_delay} = d_{total} = \sum_{i=1}^{N-1} r_i + \sum_{i=1}^{N} p_i \quad (1)$$

Upon receipt of the final Sync or Follow-Up Message, the slave device calculates its offset. It is noted here that although the sum of the propagation and residence delays at each TC (p1, r1, p2, r2, . . . ) is included in the Sync message's associated Follow-Up's offset correction field, the final propagation delay from the last TC to the slave device must be included in order to fully capture the end-to-end delay (FIG. 3).

Figure 5:
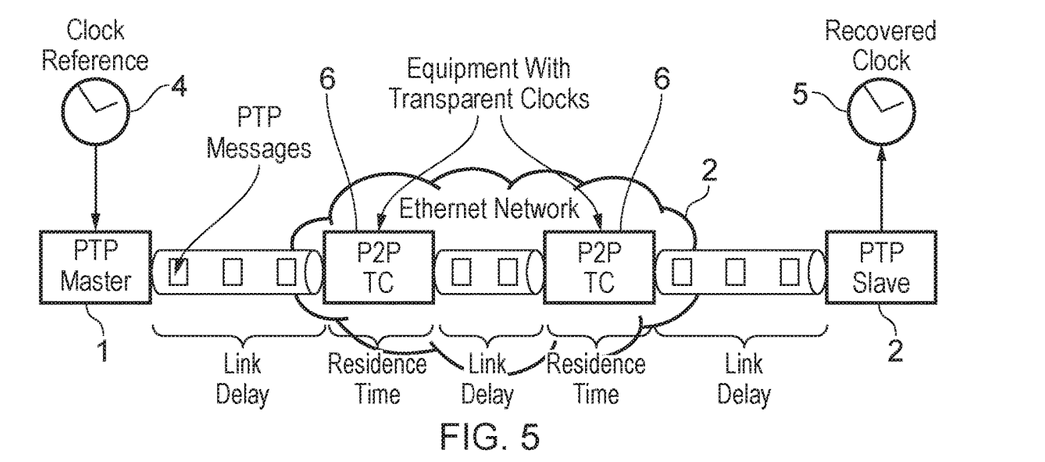
FIG. 5 shows, schematically, the principles of clock transfer using P2P transparent clocks and has already been described.

Time transfer using P2P TCs involves using the residence plus total propagation delay (in P2P TCs) at slave to mitigate PDV effects (FIG. 5). The IEEE 1588 does not describe how this should be done but left to vendor/user implementation. The standard does not specify how the clock recovery mechanism at the receiver should be implemented.

Figure 6:
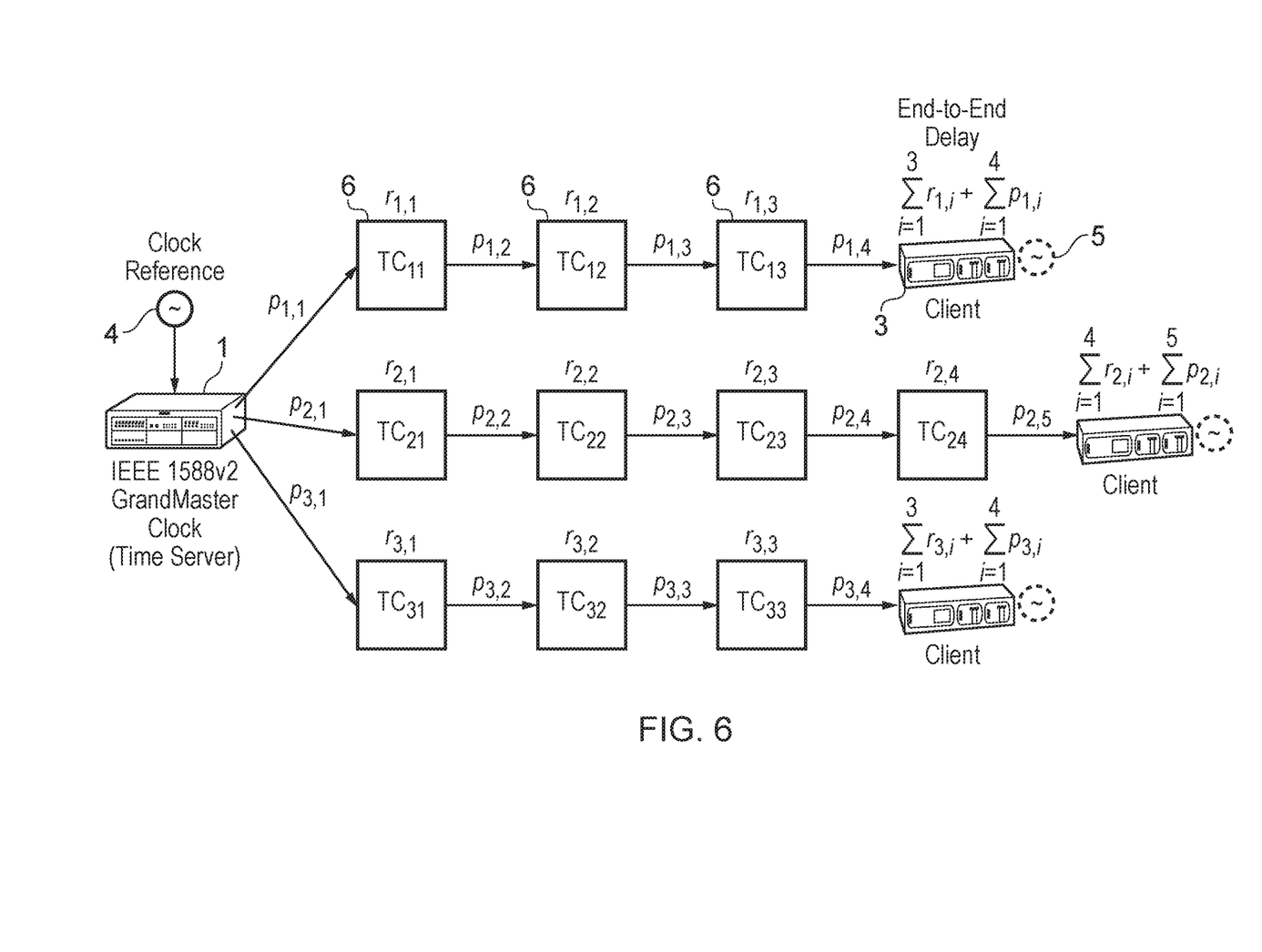
FIG. 6 shows the principles of time distribution over a network using P2P transparent clocks and has already been described.

In FIG. 6, the transparent clock devices on the communication path to each slave measure the peer link delay and the delay the Sync packet resides in the TC device and increments the correction field in the PTP header. By doing so, the slave clock or boundary clock further down the line can determine how long the Sync packet resided in the TC devices before it. The slave can then use the values in the correction field to reduce the effects PDV on its path.

Advantages of using Syntonized or Skew Compensated Transparent Clocks

Syntonizing or compensating for the skew can help in improving residence time measurement accuracy. As explained above, accurate residence time measurements enable accurate synchronization at the slave. Consider the case where a TC clock is not syntonized or contains a free-running oscillator with frequency accuracy (or skew) $\alpha_{free}$ no worse than ±100 ppm. If residence time is measured using this oscillator, there will be an error on the order of the residence time multiplied by the actual frequency offset $\alpha_{free}$.

Let $r_{ideal}$ be the ideal residence time (when the TC is accurately syntonized to the GM) and $r_{act}$ be the actual measured residence time when the TC is not accurately syntonized or the TC is using a free-running oscillator and has skew of $\alpha_{free}$. With this we have, $$r_{act}=(1+\alpha_{free})r_{ideal}=r_{ideal}+\alpha_{free}r_{ideal}=r_{ideal}+r_{error}, \quad (2)$$

In the above equation, $r_{error}$ is the (positive or negative) error in the residence time measurement when the skew is non-zero and is $\alpha_{free}$.

Optimum synchronization performance is obtained when all TCs on a synchronization path are frequency locked (syntonized) to the GM clock. If a TC is not frequency synchronized to the GM, a TC with a ±100 ppm accuracy will contribute a measurement error of ±(0.0001×10 ms)=±1 µs (or ±1000 ns) to the residence time if the ideal residence time is 10 ms. However, a positive effect is that oscillator do not typically operate at the extreme ends of their accuracy limits.

To reduce this error, IEEE 1588 Version 2 allows the TC to be syntonized, i.e., synchronized in frequency, to the GM. Each TC will use its own internal mechanisms to measure frequency offset relative to the GM and to synthesize a frequency signal that is syntonized with the GM. This synthesis may be done via hardware, firmware, or software.

Assume a network with nodes having standard Ethernet oscillators, with nominal frequencies of 25 MHz for 100 Mbit/s Ethernet and 125 MHz for 1 Gbit/s Ethernet. This means that the phase measurement granularity in the TC and ordinary clock can be as much as 40 ns for 100 Mbits/s Ethernet. Additional phase error will result from the variable component of latency in the Ethernet physical layer (PHY) (the fixed component can be specified by the manufacturer in the design).

Considering the case of a syntonized TC local oscillator. If the frequency offset between the GM and TC oscillator is measured and a syntonized frequency is created, the use of this frequency for the TC delay computation will greatly reduce the magnitude of the TC measurement errors. The phase step magnitude will now be on the order of the syntonized frequency measurement accuracy multiplied by the synch interval.

For example, if the phase measurement granularity is 40 ns (assuming a 25 MHz oscillator for 100 Mbit/s Ethernet) and the TC oscillator frequency offset is measured/syntonized over 100 ms (to be at this phase granularity or, in other words, frequency), then the measured frequency offset or skew is $40\times10^{-9}$ s/0.1 s=$400\times10^{-9}$=0.4 ppm (parts-per-million). The TC measurement error or offset now is $(400\times10^{-9})(0.01$ s)=4 ns, i.e., the TC measurement error is reduced from the 1000 ns computed when an unsyntonized clock or free-running local oscillator is used for the measurement by a factor of 250.

In practice, the reduction will not be this large because other effects are present, e.g., oscillator phase noise and drifts due to temperature effects, phase measurement error due to the variable portion of the PHY latency, and frequency measurement granularity.

For most accurate residence time measurements, the clocks in each TC should be syntonized with the GM. Syntonization only requires correction to the TC oscillator frequency. The TC host processor can use the ingress timestamps from Sync messages to determine a frequency (rate) correction required for the TC clock. Alternatively, syntonization may be handled on the TC host processor without adjusting the frequency of the TC clocks. The frequency correction may be used to modify the computed residence times inserted into Sync/Follow_Up messages.

An object of the present invention is to provide techniques that allow a P2P TC with free-running local clock to use timing message timestamps intercepted by the TC for accurate clock skew estimation.

A further object of the present invention is to improve the accuracy of the residence times computed by a P2P TC.

SUMMARY OF THE INVENTION

An exemplary embodiment of the invention provides a method of estimating the skew of a local clock in a peer-to-peer transparent clock device connected in a network between a master device having a master clock and a slave device, the method including the steps of: sending timing messages from the master device to the slave device over the network, the timing messages passing through said transparent clock device; recording times of sending of said timing messages by the master device; extracting, in the transparent clock device, from timing messages sent from the master device to the slave device, the times of sending of said timing messages; recording the times of receipt by the transparent clock device of timing messages sent from the master device to the slave device; extracting, in the transparent clock device, from the timing messages, the total delay experienced by each timing message in passing from the master device to the transparent clock device, including the residence time in other transparent clock devices between the master device and the transparent clock device; and estimating the skew of the local clock compared to the master clock using a plurality of each of said extracted and recorded times.

A further exemplary embodiment of the invention provides a peer-to-peer transparent clock device for use in a network between a master device having a master clock and a slave device, the transparent clock device having: a local clock; and a processor, wherein the transparent clock device is arranged to: receive and re-transmit timing messages sent from the master device to the slave device over the network, and the processor is arranged to: extract, from timing messages sent from the master device to the slave device, the times of sending of said timing messages; record the times of receipt by the transparent clock device of timing messages sent from the master device to the slave device; extract, from the timing messages, the total delay experienced by each timing message in passing from the master device to the transparent clock device, including the residence time in other transparent clock devices between the master device and the transparent clock device; and estimate the skew of the local clock compared to the master clock using a plurality of each of said extracted and recorded times.

A further exemplary embodiment of the present invention provides a networked time system including a master device having a master clock and a slave device, a network connecting the master device to the slave device and a peer-to-peer transparent clock device located in the network between the master device and the slave device and having a local clock, wherein: the master device is arranged to send timing messages over the network, the timing messages passing through said transparent clock device; the master device is arranged to record times of sending of said timing messages at the master device; the transparent clock device includes a local clock and a processor, and the processor is arranged to: extract, from timing messages sent from the master device to the slave device, the times of sending of said timing messages; record the times of receipt by the transparent clock device of timing messages sent from the master device to the slave device; extract, from the timing messages, the total delay experienced by each timing message in passing from the master device to the transparent clock device, including the residence time in other transparent clock devices between the master device and the transparent clock device; and estimate the skew of the local clock compared to the master clock using a plurality of each of said extracted and recorded times.

BRIEF DESCRIPTION OF THE DRAWINGS

Embodiments of the invention will now be described by way of example with reference to the accompanying drawings in which.

DETAILED DESCRIPTION

At their broadest, aspects of the present invention provide for methods and systems for estimating the skew of a local clock in an peer-to-peer transparent clock device using information from timing messages passing between a master and slave device through that transparent clock device.

A first aspect of the present invention provides a method of estimating the skew of a local clock in a peer-to-peer transparent clock device connected in a network between a master device having a master clock and a slave device, the method including the steps of: sending timing messages from the master device to the slave device over the network, the timing messages passing through said transparent clock device; recording times of sending of said timing messages by the master device; extracting, in the transparent clock device, from timing messages sent from the master device to the slave device, the times of sending of said timing messages; recording the times of receipt by the transparent clock device of timing messages sent from the master device to the slave device; extracting, in the transparent clock device, from the timing messages, the total delay experienced by each timing message in passing from the master device to the transparent clock device, including the residence time in other transparent clock devices between the master device and the transparent clock device; and estimating the skew of the local clock compared to the master clock using a plurality of each of said extracted and recorded times.

In this way the skew of the local clock can be accurately estimated using the existing pattern of timing messages exchanged between the master and slave devices and without the need for physical synchronization or use of separate timing messages.

Further, by taking account of the delays experienced by messages passing from the master device to the transparent clock device, a more accurate estimation of the skew of the local clock may be obtained.

Preferably the timing messages are messages under the IEEE 1588 PTP.

Preferably the method further includes the step of syntonizing the local clock to the master clock. By syntonizing (synchronizing the frequency) the local clock to the master clock, the timing information provided by the transparent clock can be made more accurate, but without the need for physical syntonization. The syntonization can be achieved by post-processing the output of a free-running local clock.

Preferably the method further includes the step of computing modified residence times in the transparent clock device using the estimated skew of the local clock and/or computing modified delays between the transparent clock device and other upstream devices over the network. By computing more accurate residence times in the transparent clock device, the accuracy of the synchronization of a clock in the slave device to the master clock can be improved as more accurate information regarding the delays in the network between the master and the salve device can be provided. Ideally, all transparent clocks between the master and the slave would compute modified residence times in this manner, but improvements will result even if only one of the transparent clocks operates in this manner.

Preferably the step of computing modified residence times uses a filtered value of the skew, for example using an exponentially weighted moving average filter.

The method may also include the step of the transparent clock device determining the delays between itself and neighbouring transparent clock devices and/or the master device. This may be done by the transparent clock device exchanging timing messages with neighbouring devices over the network.

In certain embodiments, the step of estimating the skew of the local clock is a linear approximation. For example, the step of estimating may include calculating the skew α as:

$$\alpha = \frac{(T_{1,n} - T_{1,n-1}) + (d_{total,n} - d_{total,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $d_{total,n}$ is the total delay experienced by the nth timing message in passing from the master device to the transparent clock device.

In certain embodiments the step of estimating the skew of the local clock includes operating a Kalman filter. For example a Kalman filter may be operated using the measurement equation $$\underbrace{(T_{1,n} - T_{2TC,n}) + d_{total,n}}_{y_n} = \underbrace{\theta_n}_{D_n X_n} + v_n$$

and the state equation $$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device, $d_{total,n}$ is the total delay including the cumulative residence time of the nth timing message sent from the master device to the slave device in other transparent clock devices whilst travelling between the master device and the transparent clock device, $y=(T_{1,n}-T_{2TC,n})+d_{total,n}$ is a scalar, n is a nonnegative time index, $D_n=[2\ 0]$ is a 1×2 matrix, $X_n^T=[\theta_n\ \alpha_n]$ is a vector, $v_n$ is the measurement noise, and $w_n^T=[w_{\theta,n}\ w_{\alpha,n}]$ is a process noise vector.

Embodiments using a Kalman filter such as that above can also estimate the offset of the local clock compared to the master clock.

The method of the present aspect may include any combination of some, all or none of the above described preferred and optional features.

The method of the above aspect is preferably implemented by a transparent clock device according to the second aspect of this invention, or a networked time system according to the third aspect of this invention, as described below, but need not be.

Further aspects of the present invention include computer programs for running on computer systems which carry out the method of the above aspect, including some, all or none of the preferred and optional features of that aspect.

A second aspect of the present invention provides a peer-to-peer transparent clock device for use in a network between a master device having a master clock and a slave device, the transparent clock device having: a local clock; and a processor, wherein the transparent clock device is arranged to: receive and re-transmit timing messages sent from the master device to the slave device over the network, and the processor is arranged to: extract, from timing messages sent from the master device to the slave device, the times of sending of said timing messages; record the times of receipt by the transparent clock device of timing messages sent from the master device to the slave device; extract, from the timing messages, the total delay experienced by each timing message in passing from the master device to the transparent clock device, including the residence time in other transparent clock devices between the master device and the transparent clock device; and estimate the skew of the local clock compared to the master clock using a plurality of each of said extracted and recorded times.

In this way the skew of the local clock can be accurately estimated using the existing pattern of timing messages exchanged between the master and slave devices and without the need for physical synchronization or use of separate timing messages.

Further, by taking account of the delays experienced by messages passing from the master device to the transparent clock device, a more accurate estimation of the skew of the local clock may be obtained.

Preferably the timing messages are messages under the IEEE 1588 PTP.

Preferably the processor is further arranged to syntonize the local clock to the master clock. By syntonizing (synchronizing the frequency) the local clock to the master clock, the timing information provided by the transparent clock can be made more accurate, but without the need for physical syntonization. The syntonization can be achieved by post-processing the output of a free-running local clock.

Preferably the processor is further arranged to compute modified residence times in the transparent clock device using the estimated skew of the local clock. By computing more accurate residence times in the transparent clock device, the accuracy of the synchronization of a clock in the slave device to the master clock can be improved as more accurate information regarding the delays in the network between the master and the salve device can be provided. Ideally, all transparent clocks between the master and the slave would compute modified residence times in this manner, but improvements will result even if only one of the transparent clocks operates in this manner.

Preferably the step of computing modified residence times uses a filtered value of the skew, for example using an exponentially weighted moving average filter.

The transparent clock device may also be arranged to determine the delays between itself and neighbouring transparent clock devices and/or the master device. This may be done by the transparent clock device exchanging timing messages with neighbouring devices over the network.

In certain embodiments the processor is arranged to estimate the skew of the local clock using a linear approximation. For example the estimation made be done by calculating the skew $\alpha$ as:

$$\alpha = \frac{(T_{1,n} - T_{1,n-1}) + (d_{total,n} - d_{total,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $d_{total,n}$ is the total delay experienced by the nth timing message in passing from the master device to the transparent clock device.

In certain embodiments the processor is arranged to estimate the skew of the local clock by operating a Kalman filter. For example a Kalman filter may be operated using the measurement equation $$\underbrace{(T_{1,n} - T_{2TC,n}) + d_{total,n}}_{y_n} = \underbrace{\theta_n}_{D_n X_n} + v_n$$

and the state equation $$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device, $d_{total,n}$ is the cumulative residence time of the nth timing message sent from the master device to the slave device in other transparent clock devices whilst travelling between the master device and the transparent clock device, $y=(T_{1,n}-T_{2TC,n})+d_{total,n}$ is a scalar, n is a nonnegative time index, $D_n=[2\ 0]$ is a 1×2 matrix, $X_n^T=[\theta_n\ \alpha_n]$ is a vector, $v_n$ is the measurement noise, and $w_n^T=[w_{\theta,n}\ w_{\alpha,n}]$ is a process noise vector.

Embodiments using a Kalman filter such as that above can also estimate the offset of the local clock compared to the master clock.

The device of the present aspect may include any combination of some, all or none of the above described preferred and optional features.

A third aspect of the present invention provides a networked time system including a master device having a master clock and a slave device, a network connecting the master device to the slave device and a peer-to-peer transparent clock device located in the network between the master device and the slave device and having a local clock, wherein: the master device is arranged to send timing messages over the network, the timing messages passing through said transparent clock device; the master device is arranged to record times of sending of said timing messages at the master device; the transparent clock device includes a local clock and a processor, and the processor is arranged to: extract, from timing messages sent from the master device to the slave device, the times of sending of said timing messages; record the times of receipt by the transparent clock device of timing messages sent from the master device to the slave device; extract, from the timing messages, the total delay experienced by each timing message in passing from the master device to the transparent clock device, including the residence time in other transparent clock devices between the master device and the transparent clock device; and estimate the skew of the local clock compared to the master clock using a plurality of each of said extracted and recorded times.

In this way the skew of the local clock can be accurately estimated using the existing pattern of timing messages exchanged between the master and slave devices and without the need for physical synchronization or use of separate timing messages.

Further, by taking account of the delays experienced by messages passing from the master device to the transparent clock device, a more accurate estimation of the skew of the local clock may be obtained.

Preferably the timing messages are messages under the IEEE 1588 PTP.

Preferably the processor is further arranged to syntonize the local clock to the master clock. By syntonizing (synchronizing the frequency) the local clock to the master clock, the timing information provided by the transparent clock can be made more accurate, but without the need for physical syntonization. The syntonization can be achieved by post-processing the output of a free-running local clock.

Preferably the processor is further arranged to compute modified residence times in the transparent clock device using the estimated skew of the local clock. By computing more accurate residence times in the transparent clock device, the accuracy of the synchronization of a clock in the slave device to the master clock can be improved as more accurate information regarding the delays in the network between the master and the salve device can be provided. Ideally, all transparent clocks between the master and the slave would compute modified residence times in this manner, but improvements will result even if only one of the transparent clocks operates in this manner.

Preferably the step of computing modified residence times uses a filtered value of the skew, for example using an exponentially weighted moving average filter.

The transparent clock device may also be arranged to determine the delays between itself and neighbouring transparent clock devices and/or the master device. This may be done by the transparent clock device exchanging timing messages with neighbouring devices over the network.

Preferably the network includes a plurality of transparent clock devices which are arranged to syntonizer their local clocks to the master clock and/or compute modified residence times.

In certain embodiments the processor is arranged to estimate the skew of the local clock using a linear approximation. For example, the estimation may be done by calculating the skew $\alpha$ as:

$$\alpha = \frac{(T_{1,n} - T_{1,n-1}) + (d_{total,n} - d_{total,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $d_{total,n}$ is the total delay experienced by the nth timing message in passing from the master device to the transparent clock device.

In certain embodiments the processor is further arranged to estimate the skew of the local clock by operating a Kalman filter. For example, the Kalman filter may be operated using the measurement equation $$\underbrace{(T_{1,n} - T_{2TC,n}) + d_{total,n}}_{y_n} = \underbrace{\theta_n}_{D_n X_n} + v_n$$

and the state equation $$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device, $d_{total,n}$ is the cumulative residence time of the nth timing message sent from the master device to the slave device in other transparent clock devices whilst travelling between the master device and the transparent clock device, $y=(T_{1,n}-T_{2TC,n})+d_{total,n}$ is a scalar, n is a nonnegative time index, $D_n=[2\ 0]$ is a 1×2 matrix, $X_n^T=[\theta_n\ \alpha_n]$ is a vector, $v_n$ is the measurement noise, and $w_n^T=[w_{\theta,n}\ w_{\alpha,n}]$ is a process noise vector.

Embodiments using a Kalman filter such as that above can also estimate the offset of the local clock compared to the master clock.

The system of the present aspect may include any combination of some, all or none of the above described preferred and optional features.

Clock Skew Estimation and Residence Time Measurement Correction at the Peer-to-Peer Transparent Clocks In the present embodiments it is assumed that a free-running local oscillator is used at a TC. The frequency of this TC local oscillator is not adjusted physically, but it is allowed to free-run. This free-running oscillator drives a counter which is in turn used for timestamping at the TC and for the uncorrected measurement of the residence times of PTP messages.

Basic Clock Model

Figure 7:
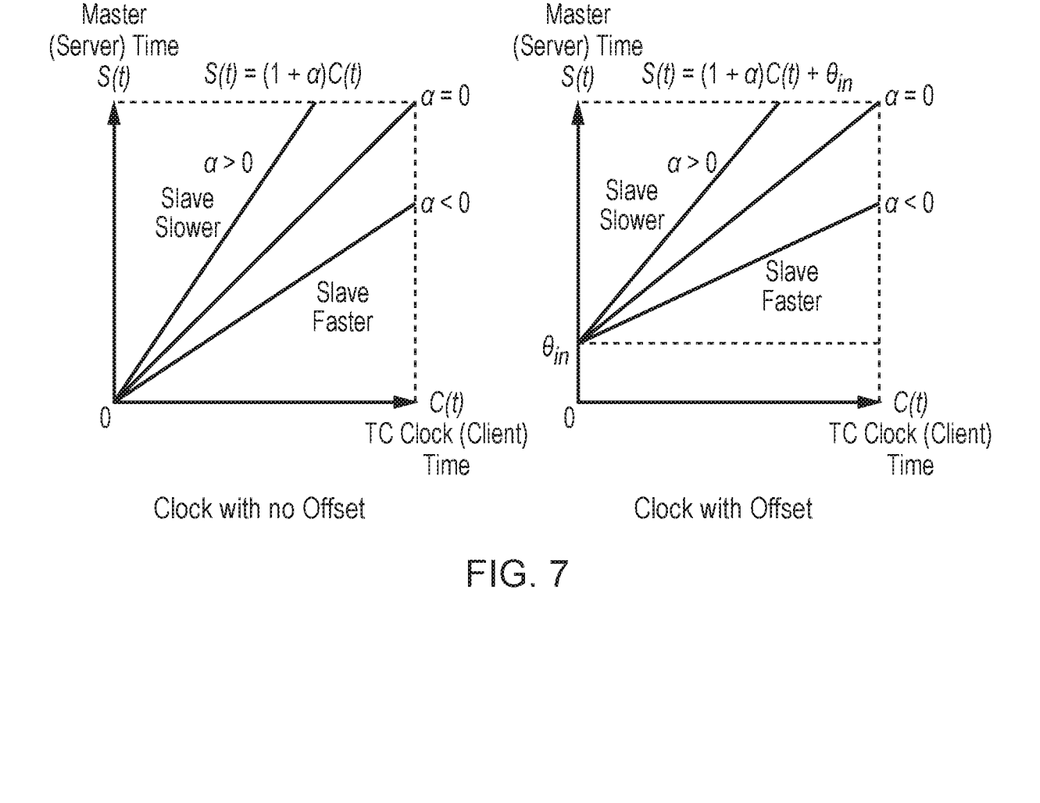
FIG. 7 shows the relationship between GrandMaster and transparent clocks with offset and skew.

First a generalized clock offset and skew equation can be defined for the synchronization problem. It is assumed that at any particular time instant, the instantaneous view of the relationship between the GM/master (server) clock with timeline S(t) and the TC (client) clock with timeline C(t), can be described by the well-known simple skew clock model depicted in FIG. 6, and described by the equation, $$S(t)=(1+\alpha)C(t)+\theta_{in}, \quad (3)$$

where $\theta_{in}$ is the initial time offset and $\alpha$ is the skew (frequency offset) which is a very small quantity in the order of parts-per-million. For example, oscillators used in Ethernet interfaces are required to have skew $\alpha$ of no more than ±100 ppm. This snapshot is an instantaneous view of how well the two clocks are (mis)aligned. FIG. 7 illustrates the influence of $\theta_{in}$ and $\alpha$ on the alignment.

Equation (3) can further be expressed as $$S(t)C(t)=\theta(t)=\alpha C(t)+\theta_{in}, \quad (4)$$

where $\theta(t)=\alpha C(t)+\theta_{in}$ is the total offset at any particular time t>0. This time varying offset which reflects the true offset between the two clocks consists of two components, one being $\theta_{in}$ the (fixed) initial offset, and the other $\alpha C(t)$ which is an offset that arises as a result of the non-zero skew between the two clocks. Time synchronization in this sense will require knowing accurately the total offset $\theta(t)$ or, equivalently, its constituent components $\alpha$ and $\theta_{in}$, when given any C(t) value.

Mechanism for Intercepting and Capturing Timestamps at the Peer-to-Peer Transparent Clock TCs are capable of intercepting PTP messages and capturing embedded and external TC triggered timestamps. That is, a TC is capable of snooping PTP messages passing through it. Assume there are KTCs 6 between the GM 1 and the slave 3. The following takes place at the kth TC, 1≤k≤K:

For Sync messages:

1. TC 6 captures its ingress timestamp $T_{2TC}$, of the arriving Sync message sent from GM 1 to slave 3.

2. TC 6 captures embedded correctionField value $d_{total}$ in Sync/Follow_Up message sent from GM 1 to slave 3. This received total delay $d_{total}$ does not include the residence time of the TC under consideration.

3. TC 6 captures embedded T timestamp in Sync or Follow_Up message sent from GM 1 to slave 3
   a. For the one-step clock:
      $T_1$ is in the originTimestamp field of Sync message and the total delay $d_{total}$ is in correctionField field of Sync message.
   b. For the two-step clock
      $T_1$ is in the preciseOriginTimestamp field of Follow_Up message and the total delay $d_{total}$ is in correctionField field of Follow_Up message.

Figure 8:
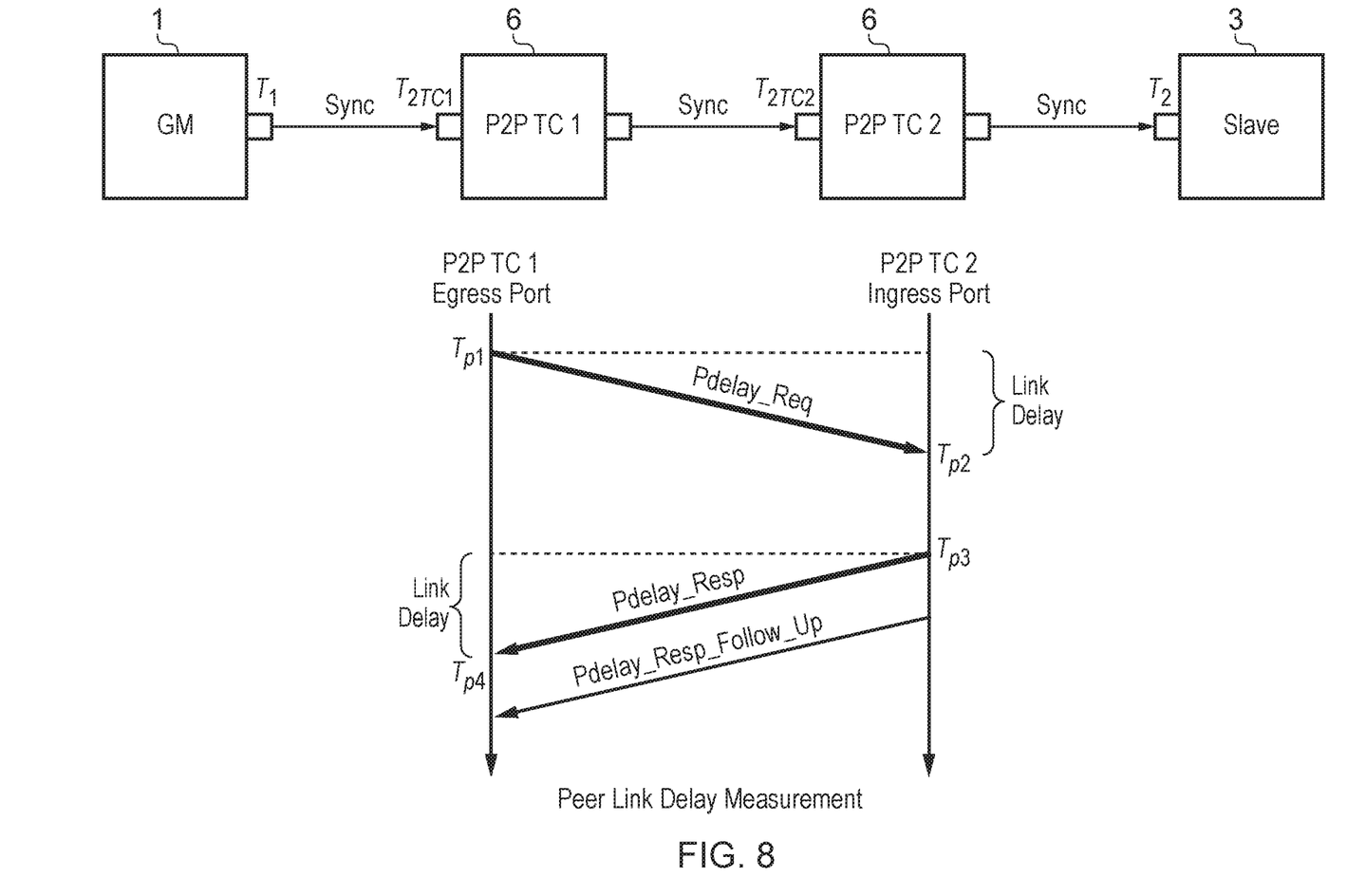
FIG. 8 illustrates the timestamps at the GrandMaster and at a transparent clock on the transmission path.

The embedded and TC triggered timestamps captured at the TC 6 (as shown in FIG. 8) are used in the computation of the TC clock skew with respect to the GM 1. Techniques for estimating the skew according to embodiments of the present invention are described below.

Basic Network Synchronization Models

The basic clock model above can be extended to account for the case where the GM/master clock 4 and slave clock 5 exchange PTP messages and with messages intercepted and timestamps captured at a particular TC 6 as described above. The communication link between a GM 1 and a TC 6 has with it a fixed and random delay. The PTP messages pass through a network of one or multiple P2P TCs 6 from GM 1 to slave 3.

For the nth Sync message which departs the master 1 with timestamp $T_{1,n}\in S(t)$ and arrives at the kth TC with timestamp $T_{2TC,n}\in C(t)$ after having experienced a delay of $d_{total,n}$ the simple skew clock model above can be extended to account for the travel time to obtain the following expression $$(T_{1,n}+d_{total,n})=(1+\alpha)T_{2TC,n}+\theta_{in} \quad (5)$$

or $$\theta_{in}=(T_{1,n}+d_{total,n})-(1+\alpha)T_{2TC,n} \quad (6)$$

A key assumption here is that the message exchanges occur over a period of time so small that the total offset $\theta$ (omitting here the time index t or n) and skew $\alpha$ can be assumed constant over that period. Two possible techniques for computing the offset $\theta$ and skew $a$ using Sync (possibly and Follow_Up) message transmissions are set out in more detail below.

Even though it is possible to compute both the offset and skew, the focus of these methods is syntonizing the TC by accurately estimating the skew. So the most important parameter here is the skew $a$ which will be used to modify the residence time measurements at the TC so that they will be as close as possible to the ideal values (as if accurate TC clock syntonization is achieved).

Simple Linear Approximation Technique Skew Estimation at the P2P TCs

For the (n-1) and nth Sync message exchange equation (5) allows the following to be derived:

$$(T_{1,n-1}+d_{total,n-1})=(1+\alpha)T_{2TC,n-1}+\theta_{in} \quad (7)$$

$$(T_{1,n}+d_{total,n})=+(1+\alpha)T_{2TC,n}+\theta_{in} \quad (8)$$

Subtracting (7) from (8) gives $$(T_{1,n}-T_{1,n-1})+(d_{total,n}-d_{total,n-1})= \quad (9)$$
$$(1+\alpha)(T_{2Tc,n}-T_{2TC,n-1})$$

$$\alpha=\frac{(T_{1,n}-T_{1,n-1})+(d_{total,n}-d_{total,n-1})}{(T_{2TC,n}-T_{2TC,n-1})}-1 \quad (10)$$

If desired, the estimated skew $a$ is then used to compute the clock offset $\theta_{in}$ as given in (6). If further desired at any given discrete time n, the estimated skew a and offset $\theta_{in}$ can be used to estimate the server time $S_n$ corresponding to a local clock value $C_n$.

The residence times can be estimated given the computed skew $\alpha$ and the ingress and egress timestamps generated upon Sync message arrivals using the free-running TC clock as follows. Let $C_{in}$ and $C_{eg}$ denote, respectively, the ingress and egress timestamps captured by the kth TC upon a Sync message arrival at any time instance. Let $\theta_{in}$ also denote the initial time offset of the TC clock with respect to the GM clock 4. Using (3), the following relationships can be derived, $$S_{in} = (1+\alpha)C_{in} + \theta_{in} \quad (11)$$

$$S_{eg} = (1+\alpha)C_{eg} + \theta_{in} \quad (12)$$

In the above equations, the ingress and egress timestamps are mapped to the ideal time reference, which in this case is that of the GM. The mapped timestamps are then used to compute the modified (or close to ideal) residence times at the TC as follows, $$r_{mod} = S_{eg} - S_{in} = (1+\alpha)(C_{eg} - C_{in}) \quad (13)$$

Note that in the above equation the raw uncorrected or skew uncompensated residence time is given by $$r_{raw} = (C_{eg} - C_{in}) \quad (14)$$

However, it can be seen from (13) that when the skew $\alpha=0$ (i.e., TC clock is perfectly syntonized to GM), then the raw residence times are the same as the ideal or modified ones, that is, $$r_{mod} = S_{eg} - S_{in} = (C_{eg} - C_{in}) = r_{raw} \quad (15)$$

To compute the modified residence times ($r_{mod}$), filtered values of the skew ($\hat{\alpha}$) preferably should be used. The filtering can be done using a simple exponentially weighted moving average (EWMA) filter $$\hat{\alpha}_n = \mu\alpha_n + (1-\mu)\hat{\alpha}_{n-1}, 0 < \mu < 1 \quad (16)$$

It can be seen from the above discussion that when using a TC with a free-running clock, only knowledge of the estimated skew is important when estimating the ideal residence times. The linear approximation described here is a relatively simple estimating technique for the skew estimation. To improve the residence time estimates, a more advanced filtering scheme based on Kalman Filtering for the skew estimation is set out below.

Kalman Filter Based Technique for Skew Estimation at the P2P TCs

Although, as indicated, the primary interest is in the skew, the models described below can be used with a Kalman filter based technique to estimate the clock offset and skew. The Kalman filter [1] allows the use of measurements of a process observed over time, containing noise and other inaccuracies, to produce values (estimates) that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value.

In order to use the Kalman filter to estimate the internal state of a process given only a sequence of noisy observations, the process must be modelled in accordance with the framework of the Kalman filter. Therefore consider a state-space model described by the following pair of equations $$\text{State Equation: } X_n = A_n X_{n-1} + w_n, \quad (17)$$

$$\text{Measurement Equation: } y_n = D_n X_n + v_n, \quad (18)$$

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0, Q_n)$, $y_n$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v_n^T]$, $v_n \sim N(0, R_n)$, and T denotes transpose. It is assumed in the model that the initial state, and the noise vectors at each step $\{X_0, w_1, \ldots, w_n, v_1, \ldots, v_n\}$ are mutually independent.

The notation $\hat{X}_{n,m}$ used below represents the estimate of X at time n given observations up to, and including at time m. The Kalman filter equations is most often conceptualized as two distinct phases: Predict and Update as described below.

Predict Phase:

The predict phase uses the state estimate from the previous time step to produce an estimate of the state at the current time step.

Predicted (a prion) state estimate:

$$\hat{X}_{n,n-1} = A_n \hat{X}_{n-1,n-1} \quad (19)$$

This predicted state estimate is also known as the a priori state estimate because, although it is an estimate of the state at the current time step, it does not include observation information from the current time step.

Predicted (a prion) estimate covariance:

$$P_{n,n-1} = A_n P_{n-1,n-1} A_n^T + Q_n \quad (20)$$

Update Phase:

In the update phase, the current a priori prediction is combined with current observation information to refine the state estimate. This improved estimate is termed the a posteriori state estimate.

Innovation or measurement residual:

$$\tilde{z}_n = y_n - D_n \hat{X}_{n,n-1} \quad (21)$$

Innovation (or residual) covariance:

$$S_n = D_n P_{n,n-1} D_n^T R_n \quad (22)$$

Optimal Kalman gain:

$$K_n = P_{n,n-1} D_n^T S_n^{-1} = P_{n,n-1} D_n^T [D_n P_{n,n-1} D_n^T + R_n]^{-1} \quad (23)$$

Updated (a posterior) state estimate:

$$\hat{X}_{n,n} = \hat{X}_{n,n-1} + K_n \tilde{z}_n = \hat{X}_{n,n-1} + K_n(y_n - D_n \hat{X}_{n,n-1}) \quad (24)$$

This is the a posteriori state estimate at time n given observations up to and including at time n. The second term in the above equation is called the correction term and it represents the amount by which to correct the propagated state estimate due to our measurement. Inspection of the Kalman gain equation shows that if the measurement noise is large, $R_n$ will be large, so that $K_n$ will be small and we would not give much credibility to the measurement y when computing the next $\hat{X}$. On the other hand, if the measurement noise is small, $R_n$ will be small, so that $K_n$ will be large and we will give a lot of credibility to the measurement when computing the next $\hat{X}$.

Updated (a posterior) estimate covariance:

$$P_{n,n} = (I - K_n D_n) P_{n,n-1} \quad (25)$$

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter requires getting a good estimate of the noise covariance matrices $Q_n$ and $R_n$. The estimation of these noise covariance is discussed in a separate document.

Development of the Measurement Equation

Assume a Sync message travels from a master 1 to the kth TC 6 experiences a total delay $d_{total,n}$ plus a stochastic delay $v_n$ (to account for all other delay components in the system). The variables $\theta_n$ and $\alpha_n$ are the total offset and skew during the nth Sync message exchange. Equation (5) above can be rewritten to account for the above conditions with the following equations $$(T_{1,n}+d_{total,n}+v_n)=(1+\alpha_n)T_{2TC,n}+\theta_{in} \quad (26)$$

It can be seen from (4) that $\theta_n = \alpha_n T_{2TC,n} + \theta_{in}$ and which means equation (26) can be expressed as $$(T_{1,n}+d_{total,n}+v_n)=T_{2TC,n}+\theta_n \quad (27)$$

The measurement equation is thus obtained as $$\underbrace{(T_{1,n} - T_{2TC,n}) + d_{total,n}}_{y_n} = \underbrace{\theta_n}_{D_n X_n} + v_n \quad (28)$$

where
n is a nonnegative time index,
$y=(T_{1,n}-T_{2TC,n})+d_{total,n}$ is a scalar,
$D_n=[1\ 0]$ is a 1×2 matrix,
$X_n^T=[\theta_n\ \alpha_n]$ is a vector, and
$v_n$ is the measurement noise.

Development of the State (Process) Equation

Here the TC clock (process) model parameters $A_n$ and $w_n$ are derived. The clock skew over two time points $T_{2,n}$ and $T_{2,n-1}$ can be estimated given two clock offsets $\theta_n$ and $\theta_{n-1}$ as $$\alpha_{n-1} = \frac{\theta_n - \theta_{n-1}}{T_{2,n} - T_{2,n-1}}. \quad (29)$$

The process dynamics for the clock while accounting for process noise can then be expressed as $$\theta_n = \theta_{n-1} + \alpha_{n-1}(T_{2,n}T_{2,n-1}) + w_{\theta,n}$$

$$\alpha_n = \alpha_{n-1} + w_{\alpha,n} \quad (30)$$

where $w_n^T=[w_{\theta,n}\ w_{\alpha,n}]$ is the process noise vector which is assumed to be drawn from a zero mean normal distribution with covariance $Q_n=E[w_n w_n^T]$. The system can be described by the following two-state dynamic model $$X_n = \begin{bmatrix} \theta_n \\ \alpha_n \end{bmatrix} = \begin{bmatrix} 1 & (T_{2,n} - T_{2,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n, \quad (31)$$

where $A_n$ is the known 2-by-2 state transition matrix. If the time between Sync messages is fixed as would be the case when a constant Sync departure rate is configured at the GM ($(T_{1,n}-T_{1,n-1})=\Delta t$), then, $\Delta T_n=(T_{2,n}-T_{2,n-1})=\Delta t$ is a constant term, and $$A_n = A = \begin{bmatrix} 1 & (T_{1,n} - T_{1,n-1}) \\ 0 & 1 \end{bmatrix} = \begin{bmatrix} 1 & \Delta t \\ 0 & 1 \end{bmatrix}. \quad (32)$$

In reality, $A_n$ is not a fixed matrix because of the variable message delays experienced in the system, thus making (31) the most appropriate expression to be used at each iteration. The clock skew ($\alpha$) estimated at the TC using any of the two techniques described above can be used to compute the modified residence times as given by (13). To achieve time synchronization or equivalently find the server time estimate $S_n$ (although not required in this problem context), the estimate $\theta_n$ from the Kalman Filter can be used in (4) to obtain $S_n$, that is, $S_n = C_n + \theta_n$.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. R. E. Kalman, "A New Approach to Linear Filtering and Prediction Problems,"*Transaction of the ASME—Journal of Basic Engineering*, March 1960, pp. 35-45.

All references referred to above are hereby incorporated by reference.

The invention claimed is:

1. A method of estimating the skew of a local clock in a peer-to-peer transparent clock device connected in a network between a master device having a master clock and a slave device, the method including the steps of:
sending timing messages from the master device to the slave device over the network, the timing messages passing through said transparent clock device;
recording times of sending of said timing messages by the master device;
extracting, in the transparent clock device, from timing messages sent from the master device to the slave device, the times of sending of said timing messages;
recording the times of receipt by the transparent clock device of timing messages sent from the master device to the slave device;
extracting, in the transparent clock device, from the timing messages, the total delay experienced by each timing message in passing from the master device to the transparent clock device, including the residence time in other transparent clock devices between the master device and the transparent clock device;
with the transparent clock device: measuring message residence time for the transparent clock device, modifying an incoming correction field with at least the measured message residence time and a peer link delay to generate a modified correction field, and sending the modified correction field to the slave device; and
estimating, in the transparent clock device, the skew of the local clock in the transparent clock device compared to the master clock using a plurality of each of said extracted and recorded times.

2. A method according to claim 1, further including the steps of syntonizing the local clock in the transparent clock device to the master clock and syntonizing a slave clock in the slave device to the master clock.

3. A method according to claim 1, further including the step of computing modified residence times in the transparent clock device using the estimated skew of the local clock.

4. A method according to claim 1 wherein the step of estimating the skew of the local clock includes:
calculating the skew α as:

$$\alpha = \frac{(T_{1,n} - T_{1,n-1}) + (d_{total,n} - d_{total,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $d_{total,n}$ is the total delay experienced by the nth timing message in passing from the master device to the transparent clock device.

5. A method according to claim 1 wherein the step of estimating the skew of the local clock includes operating a Kalman filter using the measurement equation $$\underbrace{(T_{1,n} - T_{2TC,n}) + d_{total,n}}_{y_n} = \underbrace{\theta_n}_{D_n X_n} + v_n$$

and the state equation $$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device, $d_{total,n}$ is the total delay including the cumulative residence time of the nth timing message sent from the master device to the slave device in other transparent clock devices whilst travelling between the master device and the transparent clock device, $y=(T_{1,n}-T_{2TC,n})+d_{total,n}$ is a scalar, n is a nonnegative time index, $D_n=[2\ 0]$ is a 1×2 matrix, $X_n^T=[\theta_n\ \alpha_n]$ is a vector, $v_n$ is measurement noise, and $w_n^T=[w_{\theta,n}\ w_{\alpha,n}]$ is a process noise vector.

6. A peer-to-peer transparent clock device for use in a network between a master device having a master clock and a slave device, the transparent clock device having:
a local clock; and
a processor,
wherein the transparent clock device is arranged to:
receive and re-transmit timing messages sent from the master device to the slave device over the network,
and the processor is arranged to:
extract, from timing messages sent from the master device to the slave device, the times of sending of said timing messages;
record the times of receipt by the transparent clock device of timing messages sent from the master device to the slave device;
extract, from the timing messages, the total delay experienced by each timing message in passing from the master device to the transparent clock device, including the residence time in other transparent clock devices between the master device and the transparent clock device;
measure message residence time for the transparent clock device, modify an incoming correction field with at least the measured message residence time and a peer link delay to generate a modified correction field, and send the modified correction field to the slave device; and
estimate the skew of the local clock in the transparent clock device compared to the master clock using a plurality of each of said extracted and recorded times.

7. A transparent clock device according to claim 6 wherein the processor is further arranged to syntonize the local clock in the transparent clock device to the master clock.

8. A transparent clock device according to claim 6 wherein the processor is further arranged to compute modified residence times in the transparent clock device using the estimated skew of the local clock.

9. A transparent clock device according to claim 6 wherein the processor is arranged to estimate the skew of the local clock by:
calculating the skew α as:

$$\alpha = \frac{(T_{1,n} - T_{1,n-1}) + (d_{total,n} - d_{total,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $d_{total,n}$ is the total delay experienced by the nth timing message in passing from the master device to the transparent clock device.

10. A transparent clock device according to claim 6 wherein the processor is arranged to estimate the skew of the local clock by operating a Kalman filter using the measurement equation $$\underbrace{(T_{1,n} - T_{2TC,n}) + d_{total,n}}_{y_n} = \underbrace{\theta_n}_{D_n X_n} + v_n$$

and the state equation $$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device, $d_{total,n}$ is the total delay including the cumulative residence time of the nth timing message sent from the master device to the slave device in other transparent clock devices whilst travelling between the master device and the transparent clock device, $y=(T_{1,n}-T_{2TC,n})+d_{total,n}$ is a scalar, n is a nonnegative time index, $D_n=[2\ 0]$ is a 1×2 matrix, $X_n^T=[\theta_n\ \alpha_n]$ is a vector, $v_n$ is measurement noise, and $w_n^T=[w_{\theta,n}\ w_{\alpha,n}]$ is a process noise vector.

11. A networked time system including a master device having a master clock and a slave device, a network connecting the master device to the slave device and a peer-to-peer transparent clock device located in the network between the master device and the slave device and having a local clock, wherein:
the master device is arranged to send timing messages over the network, the timing messages passing through said transparent clock device;
the master device is arranged to record times of sending of said timing messages at the master device;
the transparent clock device includes a local clock and a processor, and the processor is arranged to:
extract, from timing messages sent from the master device to the slave device, the times of sending of said timing messages;
record the times of receipt by the transparent clock device of timing messages sent from the master device to the slave device;
extract, from the timing messages, the total delay experienced by each timing message in passing from the master device to the transparent clock device, including the residence time in other transparent clock devices between the master device and the transparent clock device; and
measure message residence time for the transparent clock device, modify an incoming correction field with at least the measured message residence time and a peer link delay to generate a modified correction field, and send the modified correction field to the slave device; and
estimate the skew of the local clock in the transparent clock device compared to the master clock using a plurality of each of said extracted and recorded times.

12. A networked time system according to claim 11, wherein the processor is further arranged to syntonize the local clock in the transparent clock device to the master clock.

13. A networked time system according to claim 11, wherein the processor is further arranged to compute modified residence times in the transparent clock device using the estimated skew of the local clock.

14. A networked time system according to claim 11 wherein the processor is arranged to estimate the skew of the local clock by:
calculating the skew $\alpha$ as:

$$\alpha = \frac{(T_{1,n} - T_{1,n-1}) + (d_{total,n} - d_{total,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $d_{total,n}$ is the total delay experienced by the nth timing message in passing from the master device to the transparent clock device.

15. A networked time system according to claim 11 wherein the processor is further arranged to estimate the skew of the local clock by operating a Kalman filter using the measurement equation $$\underbrace{(T_{1,n} - T_{2TC,n}) + d_{total,n}}_{y_n} = \underbrace{\theta_n}_{D_n X_n} + v_n$$

and the state equation $$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device, $d_{total,n}$ is the total delay including the cumulative residence time of the nth timing message sent from the master device to the slave device in other transparent clock devices whilst travelling between the master device and the transparent clock device, $y=(T_{1,n}-T_{2TC,n})+d_{total,n}$ is a scalar, n is a nonnegative time index, $D_n=[2\ 0]$ is a 1×2 matrix, $X_n^T=[\theta_n\ \alpha_n]$ is a vector, $v_n$ is measurement noise, and $w_n^T=[w_{\theta,n}\ w_{\alpha,n}]$ is a process noise vector.

\* \* \* \* \*